(12) United States Patent
Vega Viveros

(10) Patent No.: US 12,351,468 B2
(45) Date of Patent: Jul. 8, 2025

(54) CONTINUOUS PROCESS FOR IODIDE CUTTING AND AUTOGENOUS FUSION AND SEPARATION OF IODINE, AND DEVICE FOR CARRYING OUT THE PROCESS

(71) Applicant: Universidad de Santiago de Chile, Santiago (CL)

(72) Inventor: Ricardo Emilio Vega Viveros, Santiago (CL)

(73) Assignee: Universidad de Santiago de Chile, Santiago (CL)

( * ) Notice: Subject to any disclaimer, the term of this patent is extended or adjusted under 35 U.S.C. 154(b) by 642 days.

(21) Appl. No.: 17/776,809

(22) PCT Filed: Nov. 5, 2020

(86) PCT No.: PCT/CL2020/050146
§ 371 (c)(1),
(2) Date: May 13, 2022

(87) PCT Pub. No.: WO2021/092707
PCT Pub. Date: May 20, 2021

(65) Prior Publication Data
US 2022/0411266 A1    Dec. 29, 2022

(30) Foreign Application Priority Data
Nov. 15, 2019 (CL) .................... 3285-2019

(51) Int. Cl.
C01B 7/14 (2006.01)
(52) U.S. Cl.
CPC .................... C01B 7/14 (2013.01)

(58) Field of Classification Search
CPC .................................................. C01B 7/14
See application file for complete search history.

(56) References Cited

U.S. PATENT DOCUMENTS

| | | | |
|---|---|---|---|
| 1,853,621 | A | 4/1932 | Jones et al. |
| 1,895,929 | A | 1/1933 | Jones |
| 1,897,031 | A | 2/1933 | Chamberlain et al. |

(Continued)

FOREIGN PATENT DOCUMENTS

| GB | 943806 A | * 12/1963 |
|---|---|---|
| JP | 2016124774 B2 | 7/2016 |
| WO | 38613 2010033945 | 3/2010 |

OTHER PUBLICATIONS

International Search Report for PCT Application PCT/CL2020/050146 dated Mar. 2, 2021.

(Continued)

*Primary Examiner* — Daniel C. McCracken
*Assistant Examiner* — Joshua Maxwell Speer
(74) *Attorney, Agent, or Firm* — Stoel Rives LLP

(57) ABSTRACT

The present invention relates to a process for obtaining and refining elemental iodine contained in an iodide solution, which specifically comprises the steps of iodide cutting, and iodine melting, which take place simultaneously by reacting the preheated iodide solution with an oxidizing agent for directly producing elemental molten iodine, without passing iodine through a crystalline state; and the step of separating elemental molten iodine from spent melt water by liquid-liquid separation; carrying out all these steps in a single system operated in continuous regime.

15 Claims, 4 Drawing Sheets

(56) References Cited

U.S. PATENT DOCUMENTS

| | | | |
|---|---|---|---|
| 1,922,693 | A | 8/1933 | Chamberlain et al. |
| 1,936,553 | A | 11/1933 | Jones |
| 2,028,099 | A | 1/1936 | Chamberlain et al. |
| 2,143,222 | A | 1/1939 | Heath |
| 2,282,289 | A | 5/1942 | Robinson |
| 3,352,614 | A | 11/1967 | Andersen |
| 4,461,711 | A | 7/1984 | Behrens et al. |
| 8,268,284 | B2 | 9/2012 | Kanbe et al. |
| 2010/0308261 | A1 | 12/2010 | Kanbe et al. |

OTHER PUBLICATIONS

Johnson, Kenneth , et al., "Iodine Geology and Extraction in Northwestern Oklahoma", Proceedings of the 34th Forum on the Geology of Industrial Minerals, vol. 102, Oklahoma Geological Survey Circular, 1999, pp. 73-79.

Kaiho, Tatsuo , "Iodine Chemistry and Applications", Wiley Online Library, 2015, pp. 1-661.

Kkrukowski , "Iodine", USGS | Mining Engineering vol. 56, 2004, pp. 541-551.

\* cited by examiner

CONTINUOUS PROCESS FOR IODIDE CUTTING AND AUTOGENOUS FUSION AND SEPARATION OF IODINE, AND DEVICE FOR CARRYING OUT THE PROCESS

CROSS REFERENCE TO RELATED APPLICATION(S)

This application is a U.S. National Stage application under 35 USC § 371 of PCT application No. PCT/CL2020/050146, filed Nov. 5, 2020, which claims priority to Chilean Application No. 3285-2019, filed Nov. 15, 2019. All the afore-mentioned applications are hereby incorporated by reference in their entirety, for any purpose.

FIELD OF THE INVENTION

The present invention refers to obtaining and refining of elemental iodine contained in a concentrated iodide solution by means of a continuous, economical, fast process and with simplified equipment. The present invention also relates to equipment for carrying out said process.

Specifically, in the process of the present invention, the iodide is reacted "hot" with an oxidizing reagent, with both reagents at a specific temperature and pressure, in a reactor with certain geometric characteristics, operated in a certain fluid dynamic regime, conditions thereof that determine that all the operations required to obtain and refine iodine be carried out simultaneously, which are conventionally carried out discontinuously and separately, namely iodide cutting, iodine melting and separation thereof, taking advantage of the reaction heat of the cutting, to generate liquid iodine, instantly, all in a continuous process, capable of automatic control, which has been called Iodine Autogenous Fusion (IAF).

BACKGROUND OF THE INVENTION

Figure 1:
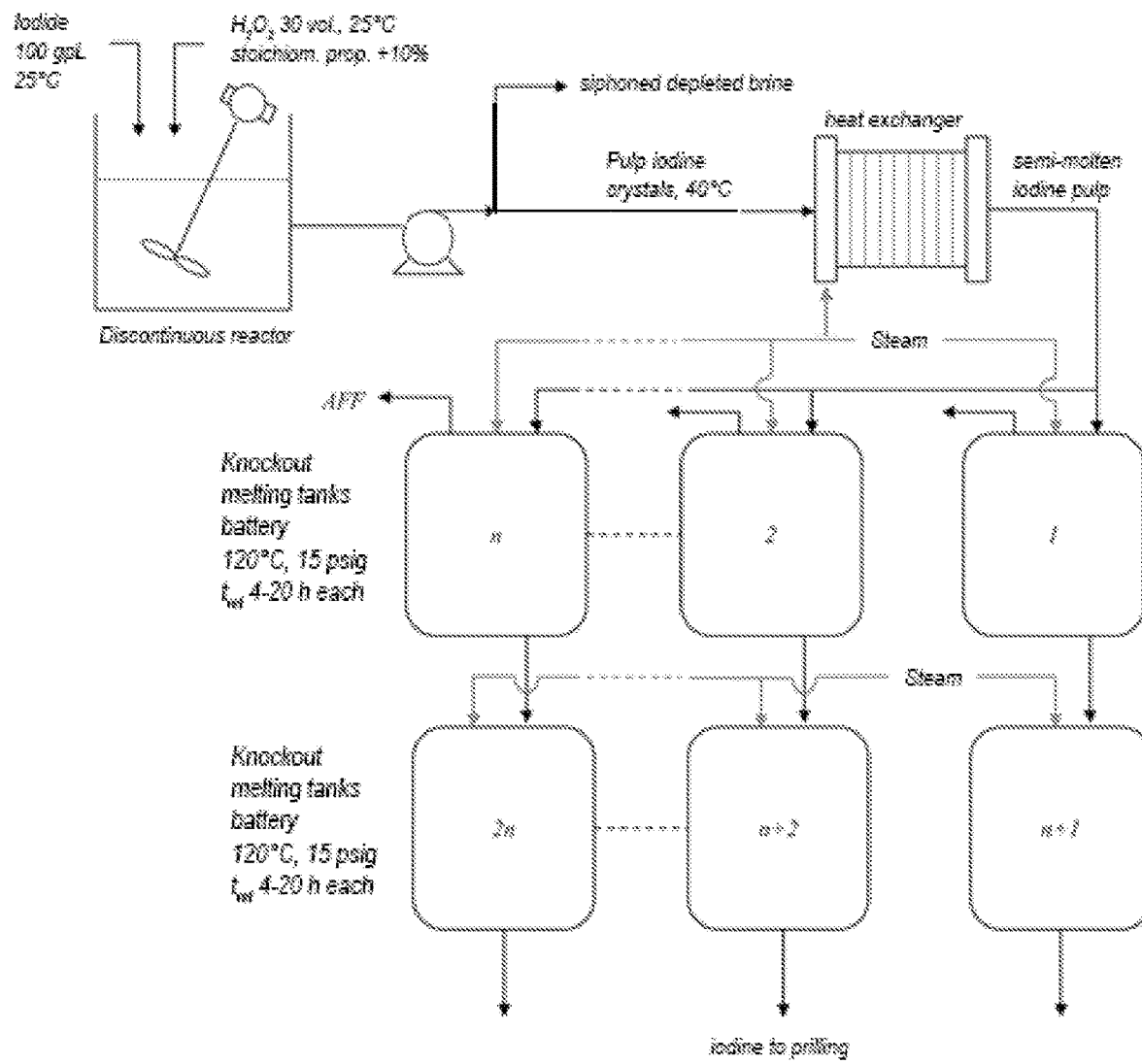
FIG. 1: Conventional line for obtaining and refining iodine.

Industrial iodine extraction processes are strongly dependent on the iodine content of the different origin mineral sources. The two largest world reserves (Ref. 1) are subsurface brines from natural gas wells in Japan, east of Tokyo, containing iodine in the form of sodium iodide, in concentrations of the order of 150-160 ppm of iodine (grams per ton of dry ore), and the nitrate deposits (caliche) of the Tarapacá and Antofagasta regions of Chile, which contain iodates at typical concentrations of 300-400 ppm iodine (Ref. 2). The reserves of these sources are estimated at 5 million and 1.8 million tons of iodine, respectively, and the iodine production from both amounts to 55% of current world production (Ref. 3).

Basically, given the low iodine content of the origin sources, current industrial processes have been configured as a sequence of two of clearly distinctive unitary operation lines: a first line, which we have called "extraction line", aimed at obtaining an either iodate or iodide (generally the latter) aqueous concentrated brine, and then another line, which we have called "refining line", devoted to the treatment of that concentrated brine to obtain refined elemental iodine. This last process line is the focus of the present invention, as previously established in the section Field of the Invention. For example (Ref. 4), the extraction line of the process begins by treating solutions of some kind of iodine, such as iodates or iodides, with iodine contents as low as 0.3 grams per liter (gpL) and, after being concentrated to 50-250 gpL. The process continues with the refining line, whose operations are intended to treat this concentrated solution to obtain elemental iodine and refine it to a solid product with a purity greater than 99.5%.

Many of the patents and research related to the subject can even be classified based on the two indicated lines. Most of the research and state of the art related to invention patents refer to unitary operations for the extraction line, which concentrate a kind of iodine (generally, iodates or iodides), among which it can be mentioned: gas-liquid extraction by air dragging or blowing (blow-out, Refs. 4, 5, 6, patents CL35944, CL37655, CL34656, CL38613, U.S. Pat. Nos. 1,853,621, 1,897,031, 1,922,693, 2,282,289, 2,143,222); cold primary cutting reaction (Refs. 4, 5, patents CL34662, CL35944, CL37655, CL34656, U.S. Pat. Nos. 1,897,031, 2,282,289, 2,143,222); solid-liquid extraction using ion exchange resins (Refs. 5, patent U.S. Pat. No. 33,526,419); or adsorption (patent Refs. U.S. Pat. Nos. 2,028,099, 1,897,031, 1,922,693) on activated carbon, for example; liquid-liquid extraction with organic or inorganic solvents (Refs. 4, 5; patents CL38613, U.S. Pat. No. 1,853,621); reduction by $SO_2$ absorption (Refs. 4, 5, patents CL34662, CL37655, CL34656, U.S. Pat. No. 2,143,222); sublimation (Refs. 5, Patent Application US2010308261); and electrolysis (patent Ref. U.S. Pat. No. 1,853,621); among other. Currently prevailing processes use some of these operations, mainly the first three, and frequently employ a combination of several of them, for obtaining an aqueous brine containing iodine, generally in the form of iodide, with iodine concentrations typically between 50 and 250 gpL. This concentrated iodide solution undergoes a filtering operation on activated carbon, known as polishing, and is finally collected in tanks before being sent for treatment in the line for obtaining and refining iodine (Ref. 4). In general, almost all the mentioned unit operations are carried out continuously and, if not, it is relatively simple to convert them to continuous operation.

However, for the refining line, i.e. of obtaining refined solid iodine, the current practice in all industries invariably consists of discontinuous, sequential and independent operations, largely supported by one or more of the following patents, with few modifications: U.S. Pat. Nos. 1,936,553A, 1,895,929A, CL35944, US2010308261, the first two being the closest to the present invention. patent U.S. Pat. No. 1,936,553 describes a discontinuous batch process for obtaining and purifying iodine, consisting of treating a batch of aqueous solution of a soluble iodide, pure or mixed with iodate, with a batch of oxidizing agent, for precipitating solid elemental iodine. If it is mixed with iodate, it is reduced to iodide by means of a reducing agent prior to oxidation. The oxidation is carried out with the reagents at room temperature, without prior heating ("cold"), precipitating solid crystalline iodine remaining suspended in the brine. Next, said suspension is heated to a temperature above 114° C., for melting the iodine, which is separated by sedimentation or siphoning. If the boiling point of the suspension is less than 114° C., for preventing it from boiling, the heating must be carried out under pressure or, preferably, the boiling point can be increased by conditioning a high concentration of salts in the suspension, which heating can be carried out at atmospheric pressure.

Patent U.S. Pat. No. 1,895,929 describes an equipment that operates by batches, for purifying the cold cutting obtained solid iodine, according to the process described in U.S. Pat. No. 1,936,553. Crude iodine crystals are stirred with a mineral acid solution, and then the mixture is heated to a temperature slightly above the melting point of iodine. Finally, the molten iodine is siphoned off or, alternatively, allowed to cool and solidify in the equipment itself.

Next, a conventional refining line, current in the industry, is described, based mainly on the patents described (Refs. 4, 5, patents U.S. Pat. Nos. 1,936,553, 1,895,929), and schematically illustrated in FIG. 1. The first operation of this refining line is so-called cutting, which is based on the oxidation reaction of the iodide ion in solution with a stoichiometric amount of a strong oxidizing reagent, such as hydrogen peroxide or iodate in aqueous solution, or gaseous chlorine, among others, to produce elemental solid iodine. A distinctive feature of this operation is that the mixing of the reagents is carried out while they are at room temperature or, in general, at temperatures below 50° C., which determines the generation of a solid iodine pulp, the latter constituting a substantive difference with the present invention and has been referred to as "cold cutting". Thus, a given volume of iodide and polished (activated carbon filtered) concentrated brine, coming from the first concentration line of the process containing iodide, hydroiodic and sulfuric acids, and salts, with an iodine concentration between 50 and 250 gpL, is charged to a stirred tank together with a stoichiometric amount of hydrogen peroxide (plus an excess of c.a. 10%), both being at temperatures below 50° C., to generate elemental iodine, in the form of a slurry of pasty consistency, crystalline solid suspended in brine. Then, the pulp is subjected to a solid iodine concentration operation, either by filtration, sedimentation, flotation, or siphoning. Next, the concentrated pulp is subjected to a melting operation, for which it is heated in a melting tank, by means of an external energy source, until it reaches the melting temperature of the crystals, ca. 114° C. The higher relative density of the liquid iodine produced (specific gravity 3.9) compared to the exhausted brine (specific gravity ca. 1.2), allows its separation from it by sedimentation, as well as its consequent washing (with the concentrated brine itself plus added sulfuric acid). Finally, the liquid iodine is subjected to a cooling operation for solidifying it in the form of a refined product, with a given geometry (generally spherical, called prill).

The proposal of the present invention reduces and/or eliminates problems presented by the conventional operations of the line for obtaining and refining iodine, a line that is common to all industrial iodine extraction processes currently in force (Ref. 5), regardless of the source of origin of the iodine, namely: 1) cold cutting of the concentrated iodide solution produced in line one, of iodide concentration, to obtain a pulp of elemental solid iodine, 2) concentration of the pulp by filtration, flotation, sedimentation or siphoning, to obtain a pulp with a higher concentration of solid iodine, 3) preheating of the concentrated pulp to facilitate the fusion of the crystals, 4) fusion of the solid iodine and separation of the liquid iodine by gravity, to obtain refined iodine free of spent brine and, 5) cooling of the liquid iodine to obtain the solid, refined iodine product.

The problems exhibited by these conventional operations are described in detail below:

1) "Cold" cutting.

Typically, an iodide solution load, containing 100 gpL of iodine, is reacted with a stoichiometric amount of hydrogen peroxide ($H_2O_2$) solution of 30% w/w, in a stirred tank type reactor, called a "cutter", open to the atmosphere, which is operated for half an hour to an hour, plus 30 minutes for loading and unloading. Due to the heat given off by the exothermic reaction, the reaction mixture reaches temperatures of 40-50° C., giving rise to a solid iodine pulp suspended in brine, since its melting point, ca. 114° C., has not been reached. The iodine pulp occludes part of the still unreacted containing iodide brine, thus hindering its contact with the peroxide, in such a way that it establishes a protective mechanism that has the apparent "passivation" effect of the reaction, that is, it manifests itself as a reduced reaction rate, although, what really occurs is a physical isolation of the reagents, as part of them remain occluded in a spongy matrix of solid iodine, which prevents the reaction, requiring more time to complete. This does not happen when the reaction is carried out hot, which is demonstrated by the evidence of the almost instantaneous rate at which liquid iodine is generated, as will be seen later. Control of cold cutting is made very difficult by the generation of bubbles due to agitation and heat reaction, sublimation of iodine, and the formation of floating flocs of pasty iodine and settling iodine crystals.

The long retention time (½ to 1 hour) required by the reaction requires bulky cutters or, alternatively, several of them, in which, when operating open wide to the atmosphere, having reached temperatures of 40-50° C., they produce important losses of iodine by sublimation with the consequent environmental problem. For example, in a typical plant that produces 20 tons of iodine/day, 20,000/100=200 $m^3$/day of 100 gpL iodide solution should be cut. Because of the agitation power, it is convenient to use cutter tanks of the order of 4 useful $m^3$, whose operating cycle is 1 h (considering only half an hour for the reaction), that is, each cutter can perform, ideally, 24 cuts/day. Thus, [200/4/24) ~] 2 cutters with [4/0.8=]5 $m^3$ each (considering 80% of useful volume) are required. The conditions of temperature, acidic environment and concentrated halogen make special equipment such as Pfaudler (a German brand of glass reactors) necessary, or the use of special alloys for the construction of the equipment, such as Hastelloy C. The loss of iodine by sublimation in the reactor open to atmosphere amounts to ca. 1.5% of the iodine produced in the batch, which represents a danger to life and health already at levels of 0.1 ppm in the work environment.

2) Pulp concentration.

This operation is carried out to produce a pulp with a high content of solid iodine, eliminating part of the contained brine, for reducing the size and operating time of the used equipment, downstream the line, such as pumps, heat exchangers, melting tanks, etc.

However, the cold cutting precipitated crystalline solid iodine acquires a pasty consistency as it is embedded with variable brine proportions, which hinders its transport and pumping because it tends to precipitate and accumulate in some parts of the equipment, causing blockages. More serious still is the fact that it makes it difficult to standardize the iodine concentration of the pulp as its complete separation from the brine. The iodine concentration in the pulp determines the value of many downstream equipment operating parameters, such as its retention times, reagents proportion, energy amounts, and its supply rates, operating temperatures, pumping and recirculation rates, agitation power, etc., so that variable iodine concentrations in the pulp result in numerous operating problems, which ultimately translate into difficulties in achieving a standard purity of the refined product.

The most practical operation that has been found is brine siphoning, an artisanal operation that is carried out in the reactor itself after the cutting reaction, obtaining pulps with highly variable iodine contents, typically between 250 and 1300 gpL, by the flocculent solid occluding varying amounts of brine. These concentrations are not easy to control, and determine that, for the example of the type of plant abovementioned in the preceding numeral, which produces 20 tons of iodine/day using iodide solution of 100 gpL, daily amounts of pulp would be obtained between [20000/250=] 80 m$^3$ and [20000/1300=]15 m$^3$, respectively. This variability is transmitted to all operations downstream the process, especially hindering the operation of heat exchangers and melting tanks, which will face the treatment of pulp loads with very dissimilar characteristics, requiring highly variable retention times to meet their requirements. One way to deal with this variability is to oversize the number and/or size of the equipment with the consequent loss of efficiency and increase ir investment, operation and maintenance costs. Additionally, the siphoning operation adds at least half an hour of open wide operation of the reactor, with the consequent addition of iodine loss and contamination by sublimation.

Likewise, other alternatives for pulp concentration, such as filtration, sedimentation, and flotation operations, are also extremely cumbersome and difficult to control, derived from the pulp characteristics: its pasty consistency makes it difficult to handle and transport, requiring a lot of manual handling, and being frequent the solid iodine sedimentation and clogging of the filter, pipes, valves and pumps, which makes necessary to maintain high pumping recirculation rates of the solutions for keeping the solids in suspension, and it is often necessary to administer pressurized air blows, greater than 100 psi to unclog the equipment, with the consequent loss of efficiency, increased operating and investment costs, and safety risks. Added to these problems is the corrosion and wear experienced by the equipment and accessories, derived from the corrosive and abrasive nature of solid iodine crystals, which requires the use of special alloys for their construction, such as Hastelloy C276, for example, or rare metals, such as Tantalum, despite which, they also require frequent maintenance, repair, and replacement, with their attendant costs.

3) Preheating of the concentrated pulp to facilitate the fusion of the crystals.

Solid iodine crystals have a low thermal conductivity (0.4581 W/m/K, at 24.4° C.), only 3 to 5 times higher than common refractory materials, and their heat of fusion is comparable to iron, although its melting point is much lower. In addition, liquid iodine has a low heat capacity (0.077 cal/g/° C., between 114 and 160° C.), 13 times lower than that of water, and its viscosity is twice that of water. All these physical properties of solid iodine combine causing a high resistance to heat transfer, resulting in extremely slow heating and melting. Long retention times make it necessary to specify larger equipment for preheating. All this makes it very inconvenient for generating solid iodine and processing it in such state, even more so considering that for its subsequent refining it needs to be smelted, and then for obtaining the refined solid product it must be solidified again, these alternated thermal treatments being the cause of proven energy inefficiency while extremely slow.

Therefore, in the conventional process, to speed up the melting process and thus reduce the size and/or number of melting tanks, the concentrated pulp is preheated before being loaded into the melting tank, for which it is pumped through indirect heat exchangers, concentric tubes or plate exchangers, using steam of minimum 16663 kgf/m2 (23.7 psia). For the example presented in section 1) Cold cutting, of a typical plant that treats iodide of 100 gpL of iodine to produce 20 tons of iodine/day, the volume of pulp to be treated ranges between 15 and 80 m$^3$/day, according to the calculations in the preceding numeral, which is a source of efficiency loss, increased investment and operating costs, by having to oversize the equipment, in order to ensure its production capacity objectives, as illustrated in the numerals below.

Given the high surface temperatures and long periods of exposure to the presence of iodine, unreacted peroxide and strong mineral acids, this equipment is particularly susceptible to corrosion, abrasion and plugging, which are inherent problems in pulping. of solid crystalline iodine as indicated above.

4) Solid iodine fusion and gravity liquid iodine separation.

A load of preheated pulp, at a temperature between 50 and 90° C. in the described heat exchangers, is fed to a Pfaudler or Hastelloy type melting tank, called "knockout" where the solid iodine melts upon reaching a temperature of 114° C. and, at the same time, the depleted brine is separated by gravity from the liquid iodine (which is located in the upper layer), in a variable period between 4 and 20 hours, depending on the lower or higher content of solid iodine in the fed pulp, after which the liquid iodine is transferred to a melting tank, called "transfer", to finish refining it, waiting for the cooling operation to obtain the refined iodine.

Normally, given the high volumes to be processed, a battery of knockout tanks of 2 m$^3$ in parallel is used, each of which is in series with a transfer tank of 1.5 m$^3$ capacity (considering 80% of the useful volume), as shown in FIG. 1. Both units are provided with indirect heating with a steam jacket at 120° C. and are of the Pfaudler type or made of Hastelloy.

The number of melting tanks of the aforementioned batteries depends on the production capacity of the plant and the residence time required for each melting tank-between 4 and 20 h in practice-, with 30 minutes for loading and unloading. Continuing with the same example given in section 1) Cold cutting, a typical plant treating iodide of 100 gpL of iodine to produce 20 tons of iodine/day, the number of required melting tanks will be calculated. Using a retention time of 4 h for melting in each pond (conservative estimate because the number of units or their size increases with longer times), each unit can perform only [24/4.5 ~]5 cycles in the day. As the production of 20 ton iodine/d requires a total of [200/2/0.8 =]125 cycles, there is a minimum requirement of [125/5=] 25 knockout melting tank and, as another battery is also used sequential of 25 knockout melting tanks, known as "transfer melters", a total of 50 melting tanks are needed, adding up to a total volume of [25* (2+1.5)=]87.5 m$^3$. In this way, the 24 daily operations of each of the 2 cutting reactors, which add up to 10 m3 in total (according to calculations made in the same section 1), must be linked with 125 daily cycles of 50 melting tanks, which add up to 87.5 m3 in total, to produce 20 tons of iodine/day. If instead of the retention time of 4 h for melting in each melting tank, the 20 hours that have been necessary on some occasions had been used, 125 daily cycles of 250 melting tanks would have been required, adding up to 437.5 m3 in total. Faced with this situation, for design purposes, an average retention time of [(4+20)/2=]12 h should be considered, which requires 125 daily cycles of 126_melting tanks, that is, an oversizing of [125/50=]2.5 times in the number of melting tanks, with a total volume of 220 m³ of melters, only due to increased retention time.

The preceding figures illustrate the amount of equipment, in size and number, as well as the complexity and cumbersomeness of the operations involved in the current conventional obtaining and refining iodine line. Furthermore, in practice, given the high temperatures and long periods of exposure to the presence of iodine, unreacted peroxide and strong mineral acids, the useful life of melting tanks is between one and two years.

Additionally, on refining by fusion with sulfuric acid, a publication appears that reinforces the problem of the current conventional process, prescribing residence times of more than 3 h for fusion. On the other hand, a quantitative method for continuous feeding of iodine to a reactor (patent Ref. U.S. Pat. No. 8,268,284), poses the drawbacks of supplying iodine at its melting point. These include the need for external thermal energy for heating, the natural tendency of iodine to sublime, and corrosion of equipment.

5) Cooling of the liquid iodine to obtain the solid, refined iodine product.

The refined liquid iodine is sent from the transfer melting tank to the top of the prilling tower, consisting of a vertical cylinder with a distributor of liquid iodine at the top therein, which falls by gravity and is cooled by air and water currents injected at various points along its length, solidifying in the form of spheres which constitute the refined solid product. When operating open to the atmosphere, with iodine at its melting point, iodine losses are produced by sublimation, with the consequent cost and environmental pollution. In addition, it is necessary to classify the product to standardize the sphere size, sending the material out of specification for reprocessing.

In summary, the conventional practice of the iodine obtaining, and refining operations of the current industrial processes suffers from the following problems:

a) Limited production capacity:

Derived from the discontinuous operation of equipment, with excessive retention times in key equipment: ½ hour (plus 1 hour for loading, unloading, and siphoning) in the cutter, from 4 to 20 hours (plus ½ hour for loading and unloading) in the knockout and transfer melting tanks. For example, assuming that a plant with a capacity of 20 tons of iodine per day operates with a total of 6 pieces of equipment in series, each with a retention time of 4 h, if the retention time in one of them were increased by operational problems at 8 hours ("bottleneck" effect), the daily production capacity would be limited to [20*24/28≈]17 ton/d.

In addition, the inherent discretization of the discontinuous operation prevents, hinders, or rather renders the automation of the process ineffective.

b) Excessive energy consumption:

Derived from the extremely slow transmission of heat from the solid iodine contained in the pulp, which is first subjected to preheating and then to melting, which determines prolonged periods of heating in both operations, with the consequent loss of heat. In addition, the cyclic solidification-fusion-solidification operations that iodine undergoes with cold cutting, and then melting and prilling, respectively, constitute an inherent source of thermal inefficiency, due to the use of indirect heating (through surfaces), aggravated by wasted cutting reaction heat.

c) Excessive difficulty of control and standardization of operational conditions:

Derived from the complex phenomenon of pasty solid iodine crystallization and flocculation generated by cold cutting under mechanical agitation (which invariably incorporates air into the reacting mass), pulps are obtained with ever-varying amounts of occluded brine, rending regularization and automation unmanageable, not only from the cutting, but also from the subsequent fusion. Crystalline solid iodine tends to settle and, when trapped by air, tends to float, causing plugging of pumps, pipes, and valves, which require cumbersome solutions such as forced air blasting and high rates of pulp recirculation for keeping the solids suspended, in addition to the time and disposition for handling frequent contingencies.

d) Inefficiency of key equipment operation

The cold cutting generated solid iodine causes an efficiency decrease of the reaction due to the isolation or shielding effect of the reagents, which requires an increase in the retention time and/or the cutter volume, or the cutter number. The concentration variability of the pulp solid iodine to be treated is transmitted downstream, hindering all subsequent operations, because of oversizing the equipment capacity that must be incurred to take said variability into account. The solid nature of the produced iodine, with its high resistance of heat transfer and low mobility, necessitates excessive heating time, i.e., a longer retention time and, therefore, a larger volume melting tank or, alternatively, several of them, for the same flow rate to be treated.

e) Excessive difficulty of product quality homogenization and regularity:

Derived from the variability in the concentrations of pulp iodine, which require varying the operating conditions of each equipment piece in which it is treated. Molten iodine in the conventional process dissolves appreciable amounts of salts present in the brine containing it, a situation that worsens with longer retention times in the fusion-separation step, negatively affecting the purity of the product.

f) Excessive number and volume of equipment

The variable operating conditions faced by the equipment, particularly in terms of retention time or flow to be treated, will invariably require increases in the equipment volume and/or increases in the equipment number thereof to maintain a given production capacity. In the case of melting tanks, the problem is aggravated both by the variable proportion of iodine in the pulp, and by its high resistance to heat transmission.

g) Excessive requirements for equipment maintenance, repair, and replacement.

To the extent that, in general, the exposure time and/or the surface amount exposed to corrosion and abrasion wear by solid crystalline iodine and by acid solutions, especially at high temperatures, increases, either by extension of the operation period, increase equipment and accessories volume or number, or increased need for transportation or handling activity, maintenance need, equipment and accessories repair and replacement will increase proportionally.

h) Excessive iodine losses

For the same reasons as in the previous points, d) and f), the greater the transport and handling, the greater the iodine sublimation loss, as well as the extension of the operation period in discontinuous equipment with high retention times, open to the atmosphere, or with a greater number of them or an increase in their volume.

i) Excessive occupational risks due to environmental pollution and safety.

Derived from the higher losses indicated above. The limit of 0.1 ppm of iodine, established by the American agency OSHA (Occupational Safety and Health Administration), highlights the risk of safety and contamination in work environments (Ref. 5).

Figure 2:
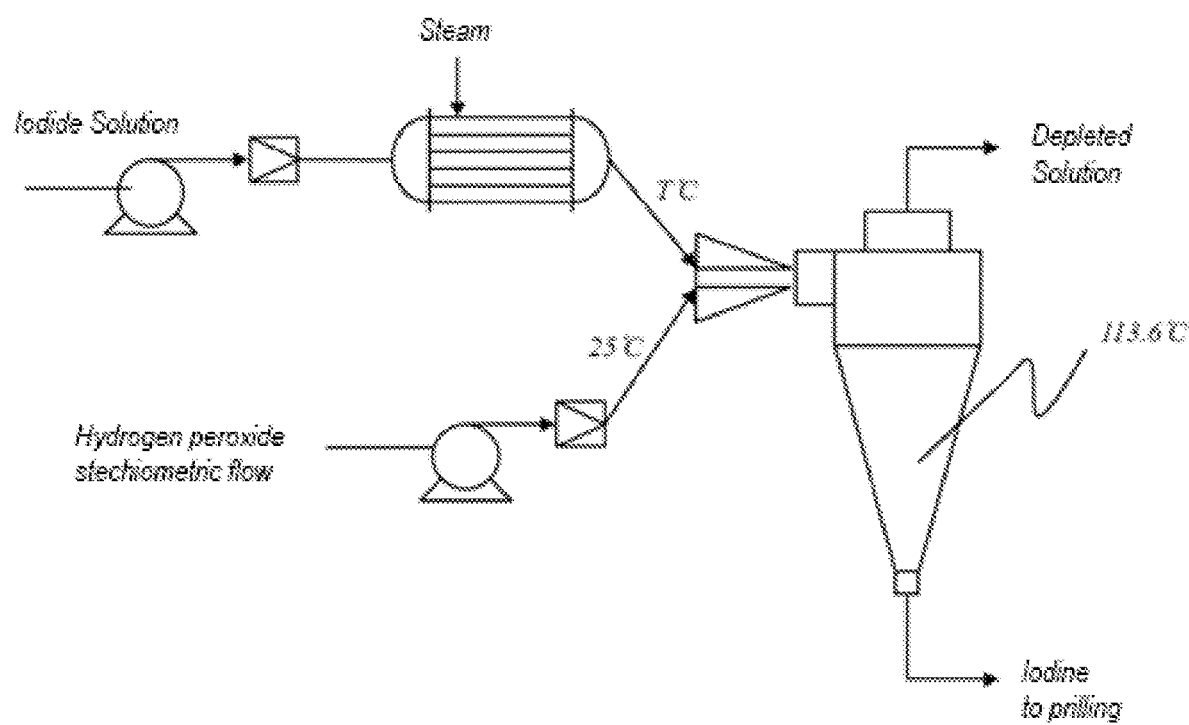
FIG. 2: Complete system that includes the equipment to carry out the IAF iodine autogenous fusion process, which includes an iodide solution heater, an oxidizing agent feeder, and a separating reactor equipment (hydrocyclone).

The present invention consists of an improved process, fully described below, with its corresponding claims, attached figures and the following description, setting forth some of the various ways in which the invention can be used. FIG. 2 represents a system and equipment suitable for carrying out the invention.

The present invention aims to solve the aforementioned problems of the state of the art, in the process of obtaining elemental iodine and refining it, through the implementation of continuous operations of both cutting and autogenous fusion and separation of the exhausted brine, regardless of the source of the iodine origin, and the extraction process used, and the iodide concentration.

The process of the present invention, in addition to being a continuous process, is much faster, simpler, more compact, safer, non-polluting and susceptible to automation. The cutting-agitated tank-type reactor need, the pulp concentrator system or equipment need, and the bulky pulp preheater need are eliminated, avoiding corrosion and abrasive wear in all these equipment, and in the transfer system between them; melting tanks with their excessive melting period are eliminated; the refined product purity is homogenized, and the plant production capacity is increased. The heating steam requirement, the maintenance, repair and replacement levels, as well as the iodine sublimation losses, and its concomitant occupational risks due to environmental contamination and safety, are reduced by replacing several equipment pieces (reaction tank, pulp separation system, pulp heat exchanger, pulp melting tank) by two simple conventional equipment (a conventional design heat exchanger for preheating a liquid solution, and a centrifugal action and/or gravity separator), both of much smaller size, and low investment, subjected to non-abrasive and less corrosive conditions.

Indeed, the transformation from a discontinuous process to a continuous one, through the autogenous fusion automatic control of the present invention, significantly reduces investment, operating costs (especially energy consumption), maintenance, repair and replacement of teams; reduces iodine losses, pollution and occupational hazards; It facilitates the transport and handling of all process streams, eliminating the incidence and the need for frequent handling of contingencies, making possible the automatic control of operations and the efficient standardization of product properties and quality.

Unlike what is known in the state of the art, the process for obtaining and purifying elemental iodine of the present invention is a continuous process, automatically controlled, which consists of treating a given flow rate of an soluble iodide aqueous solution with a stoichiometric flow rate of an oxidizing agent, "hot", that is, with the iodide flow previously heated to a temperature such that, upon contact with the oxidizing agent flow, and thanks to the reaction heat given off, the reaction products reach a temperature of 114° C. or slightly higher, so that a liquid iodine continuous flow is produced, which presents a comparative advantage with respect to the state of the art, which can translate into an important competitive advantage in the iodine industry.

Indeed, the "hot" cutting, carried out as described above, allows the iodide oxidation reaction, for example, with hydrogen peroxide to obtain elemental iodine, to take place practically at its theoretical speed, requiring only a few seconds to be completed and produce iodine in a liquid state, which is relatively easily separated from the spent liquid brine, thanks to the difference in specific gravity of [3.9-1.2=]2.7. In this way, the retention time is reduced from [1%+4.5=]6 hours of cutting and melting the conventional discontinuous process (according to the conservative scenario of the typical example of a 20 ton/day capacity plant, described in numeral 4, above), at a retention time less than one minute of the continuous IAF process, which is estimated to increase the capacity of the plant to 34 tons/day. Among other advantages of this last process, a energy consumption reduction equivalent to 10 hours of daily operation of the conventional plant can be foreseen, and an automatic control and standardization of the operational conditions that would allow regularizing the production and homogenizing the product quality.

On the other hand, the oxidation reaction of the present invention is carried out at the inlet of a reactor, which can be in the form of a hydrocyclone or a settling tank, whose hydrodynamics have been specially designed for completing the reaction and separating the liquid iodine from the supernatant, either by centrifugal and/or gravitational action, the iodine flow exiting through the bottom, while the supernatant flow exits through the top. The entire operation is carried out at a pressure higher than the supernatant boiling point.

According to what is described in the state of the art, it is possible to appreciate the differences and advantages of the present invention. Table 1 presents, in summary, a comparison of the IAF process with the conventional process for obtaining and refining elemental iodine currently in force in the industry.

Table 1. Comparison of the current conventional process and the IAF process.

TABLE 1

Comparison of the current conventional process and the IAF process.

| | CURRENT PROCESS | IAF PROCESS |
|---|---|---|
| 1 | Cutting is produced by discontinuous reaction between a load of an iodide solution and a load of some oxidizing reagent (for example, chlorine, iodate, hydrogen peroxide, among others), in a stirred tank type reactor, typically 4 m³ of capacity, with a minimum retention time of 30 minutes, plus 15 minutes for loading and another 15 minutes for unloading. | Cutting is produced by continuous reaction in an online mixer, practically instantaneously, between iodide solution stoichiometric flows and some oxidizing reagent (for example chlorine, iodate, hydrogen peroxide, among others), with a retention time less than 15 seconds, which eliminates the need for the batch cutting reactor. |
| 2 | The cutting reaction is carried out "cold", that is, with the reagents at room temperature, which produces solid crystalline iodine in the | The cutting reaction is carried out "hot", for which the flow of iodide in solution, liquid, is previously heated in a tube or plate exchanger to a |

TABLE 1-continued

Comparison of the current conventional process and the IAF process.

| | CURRENT PROCESS | IAF PROCESS |
|---|---|---|
| | form of a pulp with a pasty consistency, suspended in spent brine. The pulp will settle or float, depending on the solid iodine crystal amount it contains and the air amount it occludes, which prevents the process condition and product quality standardization. | temperature such that, on contact with the oxidant flow at room temperature, and thanks to the heat of reaction released, the reaction products reach a temperature of 114° C. or higher, at which the iodine appears in liquid state, without going through the crystalline state, allowing its separation thanks to its greater density with respect to the exhausted brine. |
| 3 | Iodine concentration in crystal slurry is usually increased by removing some of the spent brine by siphoning (or filtration, sedimentation, or flotation) to obtain a concentrated slurry, typically 250-1300 gpL iodine. | Since in the same cutting operation a liquid iodine flow is produced, which is separated by centrifugal or gravitational action (sedimentation), the need for siphoning or filtration is eliminated. |
| 4 | To free the crystals from the occluded brine, which is imperative to achieve iodine purity, the crystals must be melted, which requires long heating periods given the low thermal conductivity of solid iodine (comparable to that of a refracting material). | The cutting itself generates liquid iodine, instantaneously, in the form of micro drops suspended in a large flow of exhausted brine, which are washed and separated from it, that is, they are refined and separated in a single action, thus eliminating the long heating periods. |
| 5 | Prior to melting the iodine crystals contained in the pulp charge, it is common practice to preheat the pulp in plate or tube exchangers, equipment that experiences plugging, and abrasion and corrosion damage from the crystals, in addition to the risk and the cost involved. | The cutting reaction itself generates the energy necessary for the iodine to instantly appear in liquid form, eliminating the need to preheat the pulp. |
| 6 | The crystalline solid iodine present in the concentrated pulp batch is melted batchwise (by batches) by heating in a Pfaudler, or Hastelloy tank, typically 2 m³ capacity, fitted with a steam heating jacket at 120° C., for variable time periods between 4 and 12 hours, plus 15 minutes for loading and another 15 minutes for unloading, with the consequent excessive energy consumption and wear due to abrasion and corrosion. Once the merger is complete, the iodine is separated from the brine by decanting in the same equipment and then transferred to another Pfaudler tank, also heated, waiting to be prilled. | The liquid iodine flow, produced autogenously, is continuously separated from the exhausted brine by centrifugal action in a hydrocyclone, or by gravitational action in a decanter, whose fluid dynamics have been specially designed for this purpose, with a retention time from half minute to several minutes in the equipment, in which the reaction is completed and the liquid iodine is separated from the supernatant brine: the iodine flow exits through the bottom, being able to go directly to prilling, while the exhausted brine does so through the top. The entire operation is carried out at a pressure higher than that corresponding to the supernatant boiling point. Thus, the need for melting tanks operating during long heating periods is eliminated. |
| 7 | Operational problems that it suffers from: Limited production capacity. Excessive energy consumption. Excessive difficulty of standardization and control and operational conditions. Inefficiency in the operation of key equipment. Excessive homogenization and regularity product quality difficulty. Excessive number and volume of equipment. Excessive maintenance, repair and replacement of equipment requirements. Excessive iodine losses. Excessive labor risks due to environmental pollution and safety. | Nothing of this |
| 8 | For a 20 ton/day refined iodine plant that cuts 220 gpL iodide: Number of equipment required = 58 (Ref. 7) Total volume of cutter tanks = 10 m³ Total volume of melting tanks = 87.5 m³ Required worker number = 44 Days of maintenance required per year = 45 Heating steam consumption = 1.37 kg/kg of iodine | 5 <0.001 m³ <2 m³ 12 15 0.64 kg steam/kg iodine |
| 9 | Impractical automation | Easily automatable |

DETAILED DESCRIPTION OF THE INVENTION

The present invention allows simultaneously and continuously to carry out a process for obtaining refined elemental iodine, through controlled operations and conditions for the reaction of an iodide solution with an oxidizing agent (such as $H_2O_2$), fusion, and separation of the resulting liquid iodine. That is to say, with the present invention it is possible to achieve a process in which the steps described in the state of the art, until now carried out discontinuously (FIG. 1), are transformed into a continuous, stable and large-scale process, carried out practically in a single equipment piece (reactor-smelter-separator) designed to achieve the conditions required by the process.

The present invention relates to a process for obtaining refined elemental iodine, the result of a very fast and exothermic reaction, which occurs in a multiphase and non-isothermal hydrodynamic regime. Specifically, it refers to the operations of 1) preheating an iodide solution flow to a certain temperature, prior to the following operation, 2) cutting reaction of the specific temperature preheated iodide solution, which comprises intimately mixing said preheated solution with a solution of an oxidizing agent (for example, hydrogen peroxide) at room temperature, to directly produce molten iodine in autogenous form, bypassing the crystalline state, and 3) spent brine separation from refined liquid iodine; verifying these last two operations in a single liquid-liquid separation equipment.

The preheating of the iodide solution flow is carried out in a standard design continuous, shell-and-tube or plate heat exchanger, up to a certain temperature between 40 and 120° C., depending on the iodine content of the iodide solution flow, so that, when mixed and reacted with the oxidizing agent flow in an in-line mixer, both products and reactants manage to reach the iodine melting temperature of 113.6° C., thanks to the heat generated by the exothermic reaction, directly obtaining the molten iodine, avoiding the iodine crystallization. The reaction speed, which is theoretically instantaneous, practically does not change when it is carried out "hot", since solid iodine is not produced that occludes the iodide solution, as in the case of "cold" cutting, isolation of the reagents that would be the apparent reduction cause is not produced. Subsequently, the liquid iodine is separated from the exhausted brine by centrifugal and/or gravitational action in a device, such as a hydrocyclone, whose hydrodynamics is established to make continuous separation viable, and to ensure the obtained iodine purity.

FIG. 2 shows a system suitable for carrying out the operation of the process of the invention. The iodide flow is preheated, to a temperature determined by its iodine concentration, to then be fed simultaneously, in stoichiometric proportion, with the oxidizing agent flow to a reactor-separator unit, where they react to produce molten iodine and exhausted solution that are separated by centrifugal and/or gravitational action.

The oxidizing agent to be used in the present invention can be chlorine, bromine, nitrous acid, hydrogen peroxide, chlorate, iodate, among others. The flow proportion between the oxidizing agent and the iodide solution is a determining characteristic of the process, using a slightly higher proportion than the stoichiometric one, normally between 1% and 10% additional. On the other hand, the process allows treating solutions with a wide concentration range, both for the iodide and for the oxidizing agent, always maintaining the stoichiometric ratio between the reacting species they contain.

The produced iodine separation can be carried out, for example, in a hydrocyclone designed for molten iodine and spent brine liquid-liquid separation, which requires very specific characteristics related to design (size and geometry) and process conditions (flow rate, temperature and pressure applied).

The hydrocyclone size and geometry make it possible to provide the necessary hydrodynamics to the reactant flows for completing the reaction and separating the liquid iodine from the spent brine, while the temperature and pressure operating conditions allow the iodine to be molten and ensure that the reaction takes place in the liquid phase, avoiding the boiling of the exhausted brine.

Discontinued IAF Operation Proof of Concept

From basic research, using a laboratory scale reactor (80 mL), operated batchwise, the state-of-the-art conventional processes were reproduced, to study the technical feasibility of taking advantage of the reaction heat between the iodide and $H_2O_2$ to produce liquid iodine. Table 2 presents some experimental results of this proof of concept. It shows that for all the iodide solutions treated, covering a iodine concentration range between 61 gpL and 242 gpL, molten iodine was obtained since the maximum temperatures reached in all cases were higher than 113.6° C. It is also observed that the released reaction heat magnitude contributes the fusion required heat plus a heat proportion required by the exhausted brine and the final reaching temperature of the produced iodine, the contribution being more substantive for higher concentration iodide solutions.

TABLE 2

Results of discontinuous IAF proofs of concept.

| | | Concentration of iodide solution, iodine gpL | | | |
|---|---|---|---|---|---|
| | | 61 | 118 | 196 | 242 |
| Iodide solution volume | mL | 64 | 58 | 61 | 59 |
| Iodide sol. density | g/L | 1081 | 1138 | 1216 | 1262 |
| Water in iodide sol. | kg | 0.06374 | 0.0623 | 0.0603 | 0.0592 |
| Iodine in iodide sol. | Kg | 0.0039 | 0.0076 | 0.0125 | 0.0155 |
| Sulfuric Acid in iodide | kg | 0.0015 | 0.0029 | 0.0048 | 0.0060 |
| peroxide solution 70% w/w | kg | 0.0008 | 0.0015 | 0.0024 | 0.0030 |
| Initial iodide T | ° C. | between 60 and 104° C. | | | |
| exhausted brine final max. T | ° C. | 116 | 112 | 121 | 115 |
| Reaction heat | kcal | 0.9838 | 1.9031 | 3.1611 | 3.9030 |
| Fusion heat | kcal | 0.0580 | 0.1121 | 0.1863 | 0.2300 |
| Sensible heat (brine + iodine) | kcal | 5.7957 | 5.7942 | 5.7922 | 5.7910 |
| Spent iodine in brine | kg | 0.0005 | 0.0005 | 0.0005 | 0.0005 |
| Exhausted brine | kg | 0.0665 | 0.0672 | 0.0681 | 0.0687 |
| Liquid obtained iodine | L | 0.0009 | 0.0018 | 0.0031 | 0.0038 |
| Yield | | 0.872 | 0.935 | 0.961 | 0.969 |

Based on the evidence of the batch operation feasibility, a continuous process was designed to simultaneously carry out the iodine fusion and separation, practically instantaneously in the same reactor. This process, which the inventors have named IAF (Iodine Autogenous Fusion), was implemented on a pilot scale to study, through continuous operation, the thermodynamic and hydrodynamic behavior of the "hot" IAF cutting, as well as the conditions required for subsequent phase separation.

Embodiment or Execution Examples

The IAF process, to produce elemental iodine and iodine refining, can treat an iodide aqueous solution flow, with an iodine content in a wide concentration range, for example, between ca. 50 and ca. 250 gpL, although it has practically no more limitations than those that the previous operations could have about iodide solution concentrations. For that concentration range, the iodide solution temperature and pressure should be between 50° C. and 130° C. and between 1.0 and 5.0 bar, respectively, while the hydrogen peroxide solution concentration can be be between 15% and 70% w/w.

Figure 3:
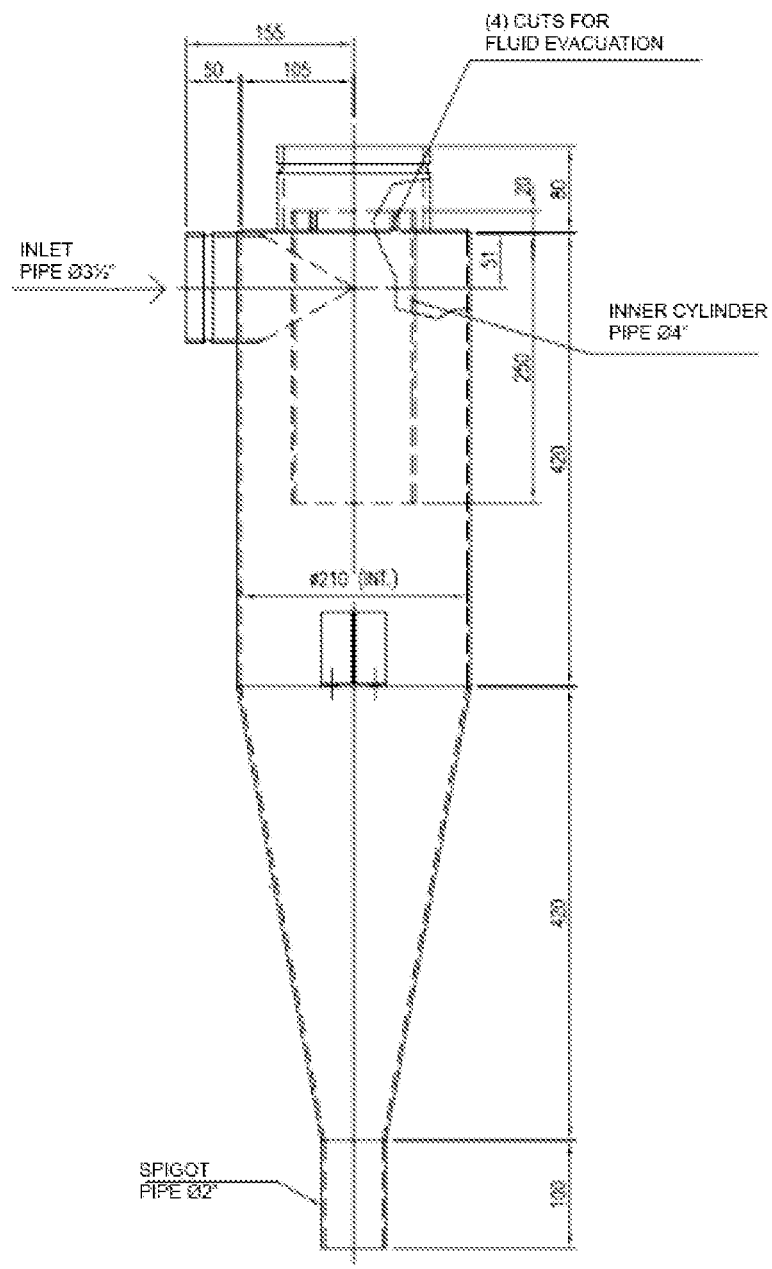
FIG. 3: Part of the system of the invention detailing the pilot hydrocyclone for the IAF process example of 20 L/min of iodide.

As an example, FIG. 3 shows the pilot hydrocyclone dimensions designed to cut 20 L/min of an iodide solution according to the IAF process. The production capacity of this pilot equipment, operating with an iodide solution flow rate of 20 L/min, is variable depending on the iodine concentration in the iodide it processes: 86; 130; and 181 tons of iodine per month for iodide 100; 150; and 210 gpL, respectively.

Figure 4:
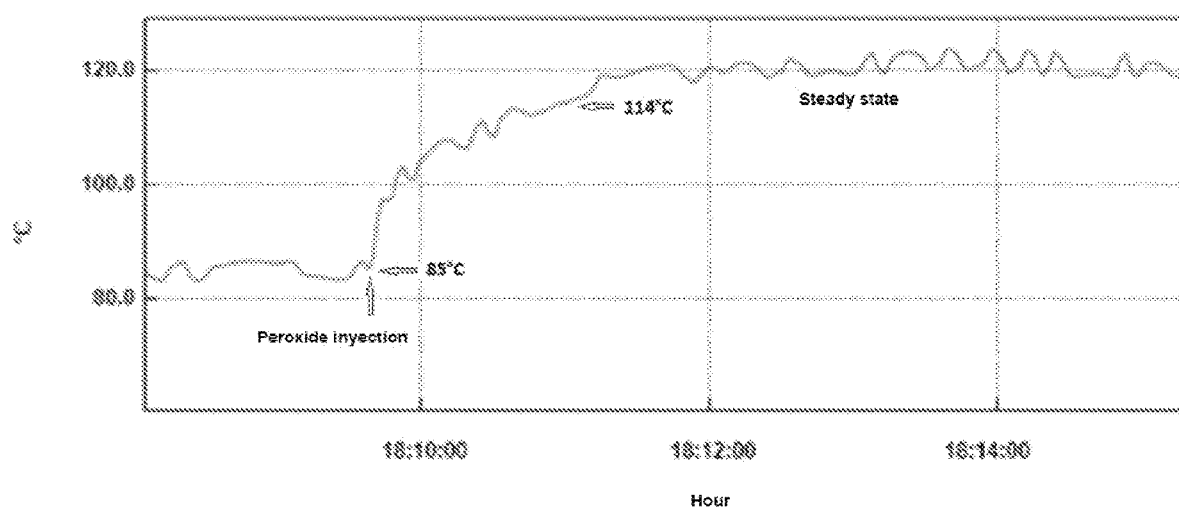
FIG. 4: Temperature record of the 142 gpL iodide hot cutting in the pilot hydrocyclone.

This hydrocyclone was used to cut a flow rate of 20±1% L/min of iodide from 142 gpL of iodine, preheated to a temperature between 50 and 110° C., with a stoichiometric flow rate (including 2% excess) of 0.62±1% L/min of 70% w/w hydrogen peroxide, which is dosed to an in-line mixer installed just at the hydrocyclone inlet. FIG. 4 shows the temperature continuous record in the hydrocyclone during the experiment, where it can be seen that, since the peroxide injection begins, there is an increase from 85° C. to 114° C. (iodine melting temperature) in 75 seconds, a transient that is due to the temperature conditioning of the line, reaching a steady state at 121±2° C. at 94 seconds from when the peroxide began to be fed, maintaining continuous operation for more than 4 minutes (the total operating time was limited in all tests to less than 10 minutes to avoid corrosion damage to the iodide dosing pump).

Through the hydrocyclone top outlet, a depleted brine flow rate of 19.04 L/min was obtained, while through the hydrocyclone bottom outlet, a liquid iodine flow rate of 0.69 L/h was obtained at a temperature of ca. 120° C. (which was collected on an iodide solution to prevent sublimed iodine vapor escape). After 4 minutes of steady-state operation, an exhausted brine sample containing 7.71 gpL of iodine and a molten iodine sample were extracted, which showed a purity of 99.6% w/w, which shows the formation of elemental iodine melted in autogenous form, and its separation from the exhausted brine, to obtain a product of high purity in liquid state.

Table 3 shows a set of operating conditions and results of various pilot tests, in continuous operation.

|  |  | Iodide concentration, iodine gpL | | |
|---|---|---|---|---|
|  |  | 97 | 142 | 210 |
| Iodide solution flow rate | L/min | 20 | 20 | 20 |
| e.g. of iodide solution | kg/m$^3$ | 1121 | 1205 | 1250 |
| iodine Flow rate in iodide | kg/min | 1.94 | 2.84 | 4.20 |
| Sulfuric acid flow 96% in iodide | kg/min | 0.78 | 1.14 | 1.69 |
| Peroxide solution flow 70% w/w | kg/min | 0.38 | 0.55 | 0.82 |
| Initial iodide solution T | ° C. | Between 65° C. and 93° C. | | |
| (Depleted brine + iodine) T | ° C. | Above 113.6° C. | | |
| Sensible heat iodide solution | kcal/min | 1371 | 1234 | 882 |
| Sensible heat depleted brine + iodine | kcal/min | 1755 | 1796 | 1714 |
| Iodine flow in depleted brine | kg/min | 0.15 | 0.15 | 0.14 |
| Exhausted brine flow | L/min | 18.46 | 19.04 | 18.41 |
| Solid iodine product flow rate | kg/min | 1.79 | 2.69 | 4.06 |
| Iodine concentration | % | 99.7 | 99.7 | 99.6 |
| Yield |  | 0.93 | 0.95 | 0.97 |

Although the final yields of the batch and continuous IAF processes; shown in tables 2 and 3, respectively, are similar, the continuous IAF process is comparatively much superior since it exhibits practically all the technical advantages presented in Table 1, making the discontinuous application useless for both the "cold" and "hot" cutting.

NON-PATENT REFERENCES (1) USGS (2013) Mineral Commodities Summary. Iodine.
(2) Chilean Copper Commission (2013) Monitoring of Industrial Minerals of Chile. Analysis of saline resources.
(3) Krukowski, S T (2004) Iodine, Min. Engng. 56: 27-28.
(4) SQM, DIP, PV (1989), Iodine Plant Operations Manual No. 3.
(5) Tatsuo Kaiho (ed., 2015) Iodine Chemistry and Applications, John Wiley, USA.
(6) Johnson K S and Gerber W R (1998). Iodine geology and extraction in northwestern Oklahoma. In: Johnson K S, (ed., 1999) Proceedings of the 34th Forum on the Geology of Industrial Minerals, Vol 102, Oklahoma Geological Survey Circular; pp 73-79.
(7) Cosayach Nitrates S.A. (2012). Emissions, discharges and residues. In: Environmental impact statement increase in iodine production Cala-Cala. Tarapaca, Chile. Retrieved from http://seia.sea.gob.cl/archivos/CAPITULO_III_Emisions_descargas_y_residuos.pdf

The invention claimed is:

1. A continuous process for obtaining and refining elemental iodine contained in an iodide solution, specifically for the steps of iodide cutting with an oxidizing agent, and iodine fusion, and separation, characterized in that:

the iodide cutting step comprises reacting a preheated iodide solution flow with an oxidizing agent flow to directly produce elemental molten iodine;

the elemental molten iodine separation from the spent melt water occurs by liquid-liquid separation, iodine cutting occurs without the passage of iodine through the crystalline state, in those said steps are carried out in a single system: the rapid shear reaction takes place almost entirely in an in-line mixer, just before entering the liquid-liquid separator, which provides sufficient time for completion and separation of the liquid iodine from the spent brine.

2. The process according to claim 1, characterized in that the cutting is carried out continuously at the iodine melting temperature (113.6° C.) or higher, which is maintained only by mixing the reacting flows, without the need to add additional heat during the reaction.

3. The method according to claim 1, characterized in that the cutting temperature is reached by taking advantage of the heat of the cutting reaction, called autogenous.

4. The process according to claim 1, characterized in that the cutting of the iodide directly produces refined iodine in liquid state.

5. The process according to claim 1, characterized in that the oxidizing agent used in the cutting reaction is selected from chlorine, bromine, nitrous acid, hydrogen peroxide, chlorate, or iodate.

6. The process according to claim 5, characterized in that the oxidizing agent is hydrogen peroxide.

7. The process according to claim 1, characterized in that, prior to cutting, the iodide solution is preheated to a temperature that depends on its iodine content and the oxidizing agent nature.

8. The process according to claim 7, characterized in that the preheating temperature is between 50° C. and 130° C. for iodide with an iodine content between 50 ca. and ca. 250 gpL, when the oxidant is hydrogen peroxide.

9. The process according to claim 1, characterized in that the cutting is carried out in a stoichiometric proportion of the reactive species contained in the respective iodide and oxidizing agent flows, with a slight excess of the latter.

10. The process according to claim 9, characterized in that the cutting is carried out with an oxidizing agent excess between 1% and 7% over the stoichiometric proportion when the agent is hydrogen peroxide.

11. The process according to claim 1, characterized in that the cutting is carried out in a concentration range between 50 and 250 gpL of iodine for the iodide solution, and between 15% and 70% w/w for the oxidizing agent solution when it is hydrogen peroxide.

12. The process according to claim 11, characterized in that the iodide solution is subjected to a pressure between 1.0 and 5.0 bar.

13. The process according to claim 1, characterized in that it is carried out in a purposefully designed by centrifugal and/or gravitational action liquid-liquid separation equipment, such as a hydrocyclone or a settler, of size and geometry determined to provide the necessary hydrodynamics in continuous operation, which are required to complete the reaction and carry out the refined liquid iodine and the exhausted brine separation, at the iodine melting temperature, or higher, and a pressure higher than the vapor pressure of the spent brine at the reaction temperature.

14. A system for carrying out a continuous process for obtaining and refining elemental iodine contained in an iodide solution, characterized in that it comprises:

an iodide solution heater, a feeder for the oxidizing agent flow and a feeder for the iodide solution flow, which simultaneously lead both flows to a mixing point in an in-line mixer, where iodide cutting takes place, producing practically instantaneously elemental liquid iodine and spent solution, and a separator reactor located immediately downstream of the mixing point, that allows to complete the cutting reaction and carry out the separation of the streams of the refined molten iodine and the depleted solution.

15. The system of claim 14, characterized in that the separating reactor is a hydrocyclone.

* * * * *